(12) United States Patent
Suzuki et al.

(10) Patent No.: US 7,286,448 B2
(45) Date of Patent: Oct. 23, 2007

(54) ACTUATOR FOR USE IN PICKUP DEVICE IN REDUCING LENS DISTORTION

(75) Inventors: Jun Suzuki, Tokorozawa (JP); Eiji Kuroki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 622 days.

(21) Appl. No.: 10/699,836

(22) Filed: Nov. 4, 2003

(65) Prior Publication Data

US 2004/0093610 A1 May 13, 2004

(30) Foreign Application Priority Data

Nov. 8, 2002 (JP) .............................. 2002-326147

(51) Int. Cl.
*G11B 7/24* (2006.01)
*G02B 7/02* (2006.01)
(52) U.S. Cl. ................ 369/44.14; 369/44.22; 359/819
(58) Field of Classification Search ........... 369/44.14, 369/44.22; 359/819, 719, 808
See application file for complete search history.

(56) References Cited

U.S. PATENT DOCUMENTS

| | | | | |
|---|---|---|---|---|
| 4,660,190 A | * | 4/1987 | Fujii et al. ................ | 369/44.16 |
| 5,200,940 A | * | 4/1993 | Goto et al. ................ | 369/44.15 |
| 5,272,569 A | * | 12/1993 | White et al. ................ | 359/814 |
| 5,523,891 A | * | 6/1996 | Fujisawa .................... | 359/813 |
| 5,663,843 A | | 9/1997 | Ezawa et al. ................ | 359/824 |
| 5,781,351 A | | 7/1998 | Murakami et al. .......... | 359/808 |
| 5,909,323 A | * | 6/1999 | Blake et al. ................. | 359/814 |
| 6,021,108 A | * | 2/2000 | Arai et al. ................... | 720/685 |
| 6,342,979 B1 | * | 1/2002 | Hori ........................... | 359/819 |
| 6,480,346 B2 | * | 11/2002 | Funakoshi .................. | 359/808 |
| 2002/0041563 A1 | | 4/2002 | Shinozuka et al. ......... | 369/244 |
| 2002/0141323 A1 | | 10/2002 | Horita et al. .......... | 369/112.23 |
| 2003/0179469 A1 | * | 9/2003 | Maeda et al. ............... | 359/719 |

FOREIGN PATENT DOCUMENTS

| | | |
|---|---|---|
| EP | 1 024 483 A1 | 8/2000 |
| JP | 03292643 A * | 12/1991 |
| JP | 11-110800 | 4/1999 |

OTHER PUBLICATIONS

European Search Report dated Sep. 6, 2005.

* cited by examiner

*Primary Examiner*—Gautam R. Patel
(74) *Attorney, Agent, or Firm*—Kratz, Quintos & Hanson, LLP

(57) ABSTRACT

Provided is an actuator for use in a pickup device, which can improve the quality of the pickup device by reducing a lens distortion even when the frequency of an electromagnetic drive rises beyond a servo band and causes resonance of a lens holder. An adhesive layer (11) is formed between an outer peripheral portion (6A) of an objective lens (6) and a lens holder (4). This adhesive layer (11) has a sufficient thickness dimension enough to absorb deformation of the lens holder (4) even when the lens holder (4) is deformed due to resonance. Even when the frequency at which an electromagnetic drive (9) operates rises beyond the servo band and causes resonance of the lens holder (4), the adhesive layer (11) functions as a buffer so that deformation of the lens holder (4) is less transmitted to the objective lens (6).

9 Claims, 6 Drawing Sheets

ACTUATOR FOR USE IN PICKUP DEVICE IN REDUCING LENS DISTORTION

BACKGROUND OF THE INVENTION

1. Field of the Invention

The present invention relates to an actuator for use in a pickup device which moves a lens holder holding an objective lens.

2. Description of Related Art

A disk drive apparatus for recording/reproducing data on/from an optical disk such as a CD (Compact Disk), DVD (Digital Video Disk), or the like is constituted by including an optical pickup device.

The pickup device guides a laser beam emitted from a light source such as a laser diode or the like to an objective lens by a predetermined optical system component, and irradiates the laser beam on a data recording surface of the optical disk.

Normally, the objective lens is arranged to face the optical disk. The laser beam from the light source is guided firstly to a position immediately below the objective lens along an optical path parallel to the optical disk by the optical system component. The laser beam is then oriented upward vertically by an uprise mirror arranged immediately below the objective lens and reaches the objective lens.

In order to record/reproduce data correctly on/from the optical disk, the pickup device performs focus control for controlling the distance between the data recording surface of the disk and the objective lens, and also performs tracking control for controlling the objective lens to follow data tracks of the optical disk.

To achieve the focus control and tracking control, the objective lens is fixed by adhesion to a lens holder throughout the entire circumference of the substantially ring-like outer peripheral portion of the objective lens. The pickup device is provided with an actuator which moves the lens holder in the focusing direction and in the tracking direction by means of an electromagnetic drive.

Considered as an electromagnetic drive of this kind will be a mechanism which has a coil board attached to the lens holder and a magnet provided near the coil board. A drive current is fed to the coil board in a magnetic field formed by the magnet, to move the lens holder in the directions described above relative to the optical disk.

A drive current is thus fed to the coil board of the electromagnetic drive, and the frequency of an electromagnetic wave generated by the coil board reaches a predetermined servo band (e.g., 0 to 5 KHz). Then, the electromagnetic drive is activated so that the lens holder moves together with the coil board.

If the lens holder resonates in the servo band, there may be a drawback that the actuator stops. It is hence necessary to set the resonance frequencies of movable components such as the lens holder, coil, and the like higher than the servo band.

Any optical disk has very small concaves and convexes on its surface due to molding precision. Therefore, if focus servo control is performed, not only the surface rocking of the optical disk occurs but also focus error signals are generated following the concaves and convexes, so a high frequency is incurred. If a part of the frequency components of the focus error signals coincides with the resonance frequency of the lens holder, the lens holder resonates. As a result, the lens holder is deformed and the stress of deformation is transmitted to the objective lens, causing an optical aberration.

That is, the objective lens is securely fixed to the lens holder by a thin adhesion layer throughout the entire circumference of the substantially ring-like outer peripheral portion of the objective lens. Therefore, the deformation of the lens holder caused by the resonance is directly transmitted to the objective lens, so that the lens distortion may be incurred to degrade the quality of the pickup device.

In this case, the servo band is the frequency band that the device should respond to when reading data from an optical disk. Sufficient reading is possible even when the pickup device does not respond to a higher band.

It is possible to design a low-pass filter which extracts the desired servo band of 0 to 5 KHz as an error signal. However, there are difficulties in designing a filter having sharp pass-band characteristics. The frequency of the electromagnetic drive therefore has characteristics that the frequency of 0 to 5 KHz is allowed to pass and any higher frequency gently and gradually attenuates. There is however a case that some frequency beyond the servo band coincides with the resonance frequency of the lens holder. In this case, the deformation of the lens holder as described above is incurred.

SUMMARY OF THE INVENTION

The present invention has a main object of providing an actuator for use in a pickup device which improves the quality of the pickup device by reducing lens distortion even when the frequency of an electromagnetic drive rises beyond a servo band and the lens holder resonates.

An actuator for use in a pickup device, according to the present invention, moves a lens holder holding an outer peripheral portion of an objective lens, and is characterized in that an adhesive layer is formed between the outer peripheral portion of the objective lens and the lens holder, the adhesive layer having a thickness dimension which is sufficient enough to absorb deformation of the lens holder when the lens holder is deformed due to resonance.

Another actuator for use in a pickup device, according to the present invention, moves a lens holder holding an outer peripheral portion of an objective lens by means of an electromagnetic drive, and is characterized in that the outer peripheral portion of the objective lens and the lens holder are provided, maintaining a predetermined clearance between each other, an adhesive agent is provided in the clearance, and a resonance frequency f of the objective lens is set higher than a predetermined servo band to be applied to drive the electromagnetic drive, and lower than a resonance frequency of the lens holder, the resonance frequency f of the objective lens being obtained by an expression:

$$f = \sqrt{\frac{k}{m}}$$

where k is a spring constant of the adhesive agent and m is mass of the objective lens.

DETAILED DESCRIPTION OF THE PREFERRED EMBODIMENT(S)

Hereinafter, embodiments of the present invention will be described with reference to the drawings. In the embodiments, identical components are respectively denoted at identical reference symbols. Detailed descriptions of those components will be omitted or simplified.

First Embodiment

[Structure of Pickup Device]

Figure 1:
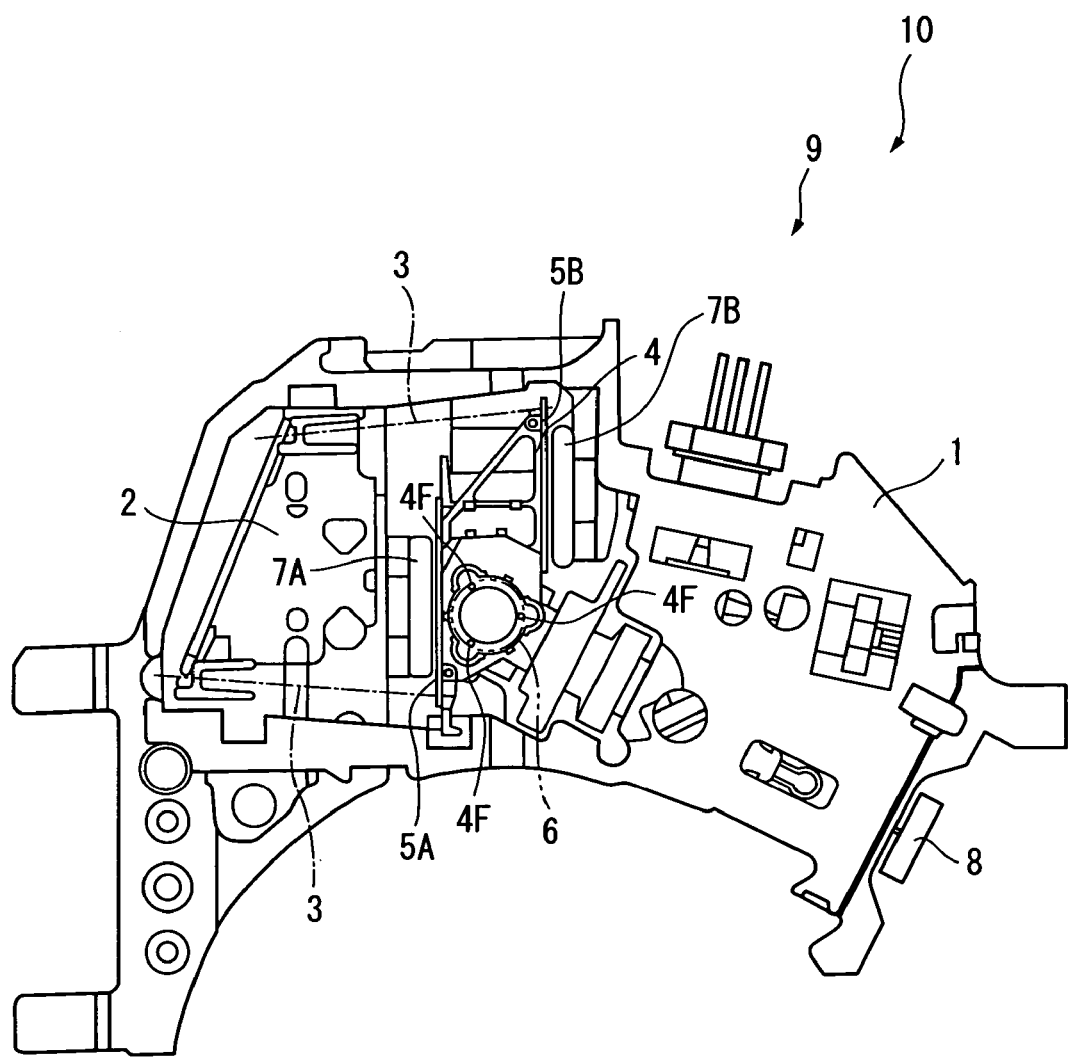
FIG. 1 is a plan view showing an entire pickup device to which an actuator for use in a pickup device, according to a first embodiment of the present invention, is applied.
Figure 2:
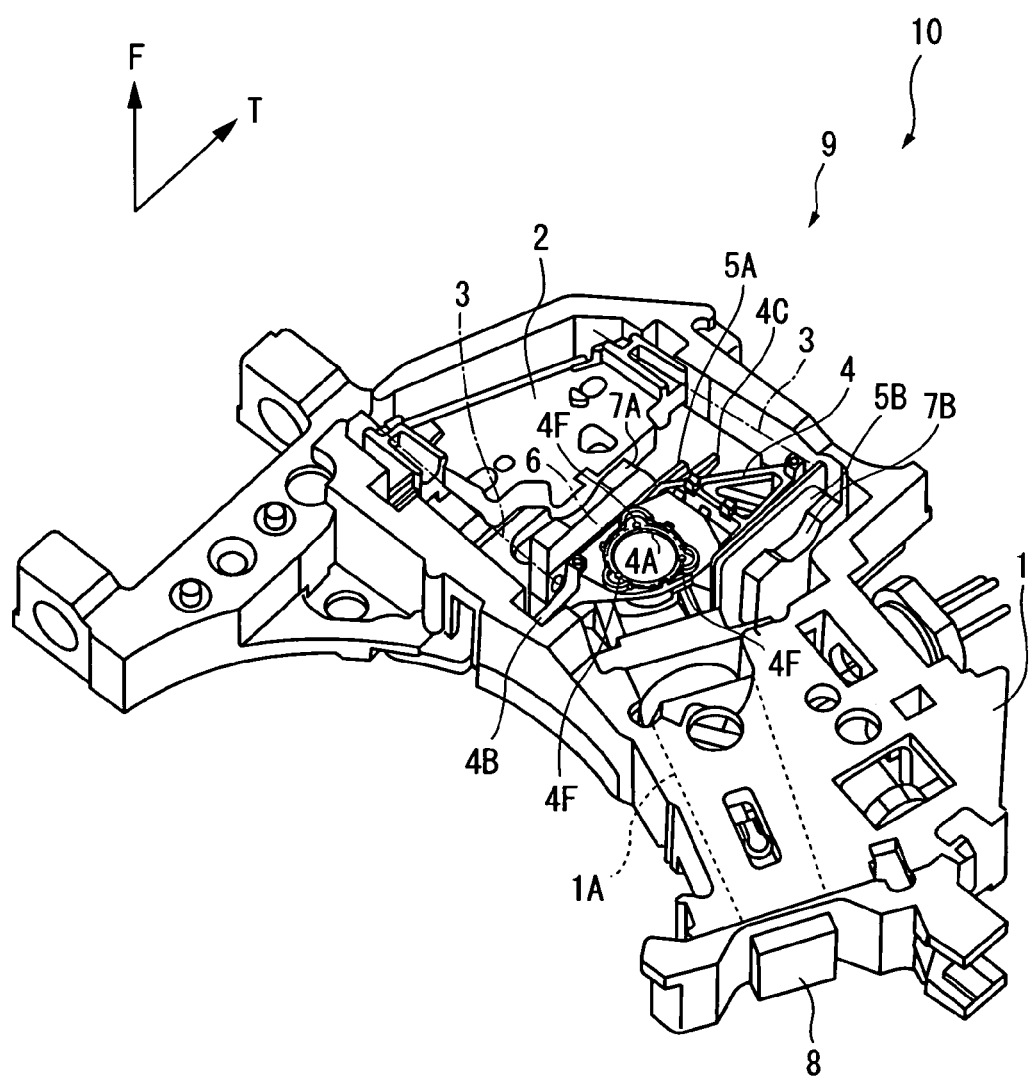
FIG. 2 is a perspective view of the actuator for use in a pickup device.

FIG. 1 is a plan view showing an entire pickup device to which an actuator according to a first embodiment is applied. FIG. 2 is a perspective view thereof.

In FIGS. 1 and 2, the pickup device has a body 1 to which an actuator base 2 is fixed. This actuator base 2 supports a lens holder 4 made of synthetic resins by four (only two are shown in the figures) suspension wires 3, making the lens holder 4 movable in the focusing direction F and tracking direction T.

Coil boards 5A and 5B are attached to side surfaces of the lens holder 4. An objective lens 6 is mounted on the upper surface of the holder.

Magnets 7A and 7B are fixed to the body 1, respectively facing the pair of coil boards 5A and 5B thus attached to the lens holder 4.

The paired magnets 7A and 7B are fixed to positions where the magnets face each other. A magnetic field is formed between the magnets 7A and 7B, corresponding to the magnetic patterns of the magnets.

The lens holder 4 having the side surfaces to which the coil boards 5A and 5B are attached is located in the magnetic field created by the magnets 7A and 7B. Therefore, when focusing and tracking coils formed on the coil boards 5A and 5B are electrically conducted to a drive current which provides a frequency of a predetermined servo band (e.g., 0 to 5 KHz), a force which is generated by the current in the coils and by the magnetic field acts on the lens holder 4 to move in the focusing direction F and the tracking direction T, together with the objective lens 6.

A laser light source 8 is attached to an end portion of the body 1. A laser beam emitted from the laser light source 8 reaches below the objective lens 6, traveling along an optical path 1A constituted by an optical system provided in the body 1. An uprise mirror (not shown) is provided below the objective lens 6. The course of the laser beam is changed upward by the uprise mirror, and the beam passes through the objective lens 6 from the downside to the upside. An optical disk not shown is provided above the objective lens 6, and the objective lens 6 focuses the laser beam on a data recording surface of the optical disk.

[Structure of Actuator]

In the first embodiment, a predetermined electromagnetic drive 9 is constituted by the pair of coil boards 5A and 5B and the pair of magnets 7A and 7B to move the objective lens 6 in the focusing direction F and in the tracking direction T. This electromagnetic drive 9, the actuator base 2, and the lens holder 4 constitute an actuator 10.

The coil boards 5A and 5B each are a printed board. A tracking coil and a focusing coil, which are not shown in the figures, are formed on the surface of each of the boards. On the coil board 5A, a rand (not shown) for conduction to the facing coil board 5B is formed.

Attached to the side surfaces of the lens holder 4, the focusing coil of the coil bard 5A and the focusing coil of the coil board 5B are substantially facing each other.

[Structure of Lens Holder]

Figure 3:
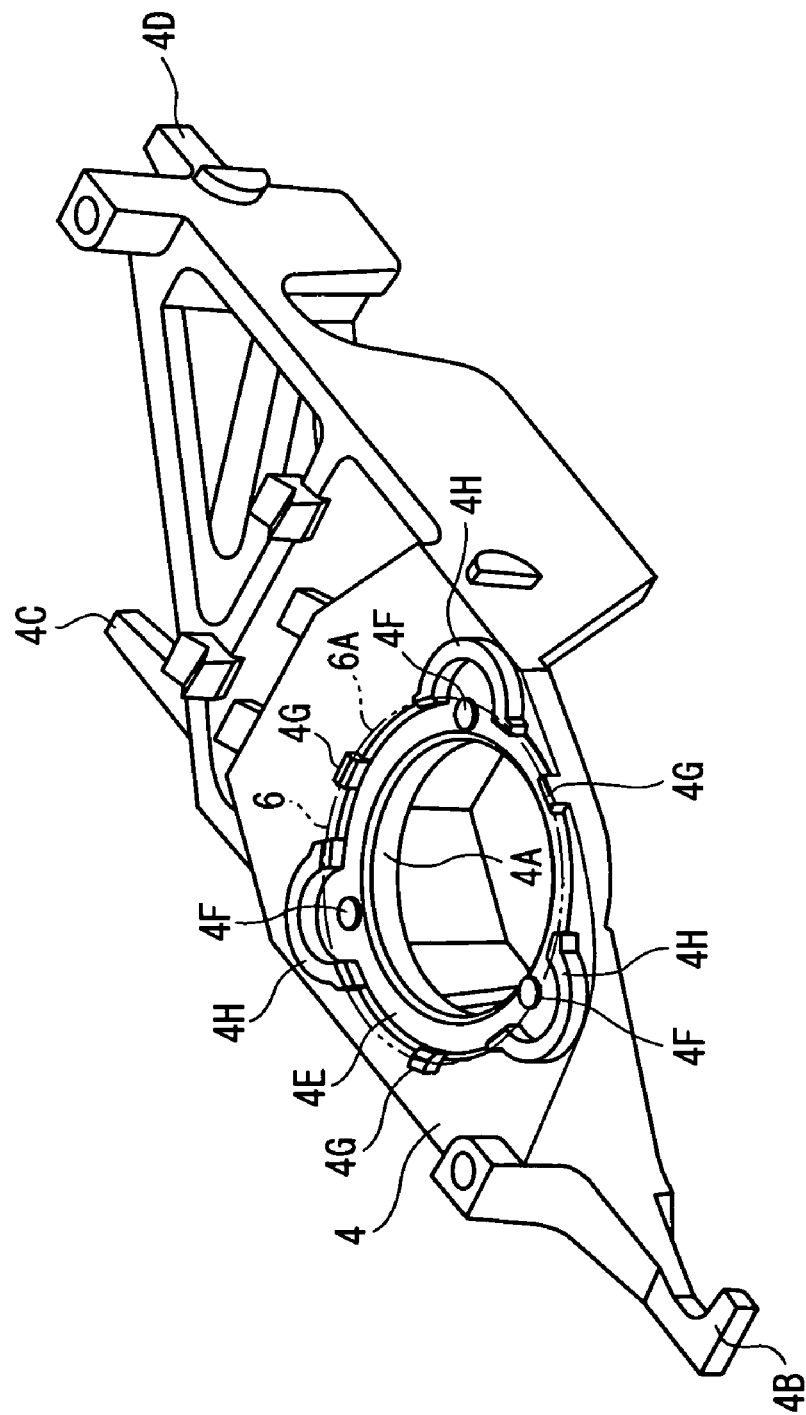
FIG. 3 is a perspective view showing the details of the structure of a lens holder.

FIG. 3 shows a specific structure of the lens holder 4.

In FIG. 3, a flat circular mounting hole 4A for mounting the objective lens 6 is formed on the lens holder 4. The mounting hole 4A is provided, deviated toward the optical path from the barycenter of the lens holder 4.

The median points of the two suspension wires 3 supporting the lens holder 4 and extending to the positions fixed to the lens holder 4 are substantially coincide with the barycenter of the lens holder 4.

The lens holder 4 is provided with stoppers 4B, 4C, and 4D integrally. The stoppers 4B, 4C, and 4D limit the strokes (movable ranges) of the lens holder 4 in the focusing direction F and the tracking direction T. With this arrangement, when the focusing servomechanism and/or the tracking servomechanism causes an operation error, it is prevented that the lens holder 4 moves and collides with the body 1 and/or other components to damage the lens holder 4 itself, the objective lens 6 or the like.

The stopper 4B acts both in the focusing direction and in the tracking direction.

Figure 4:
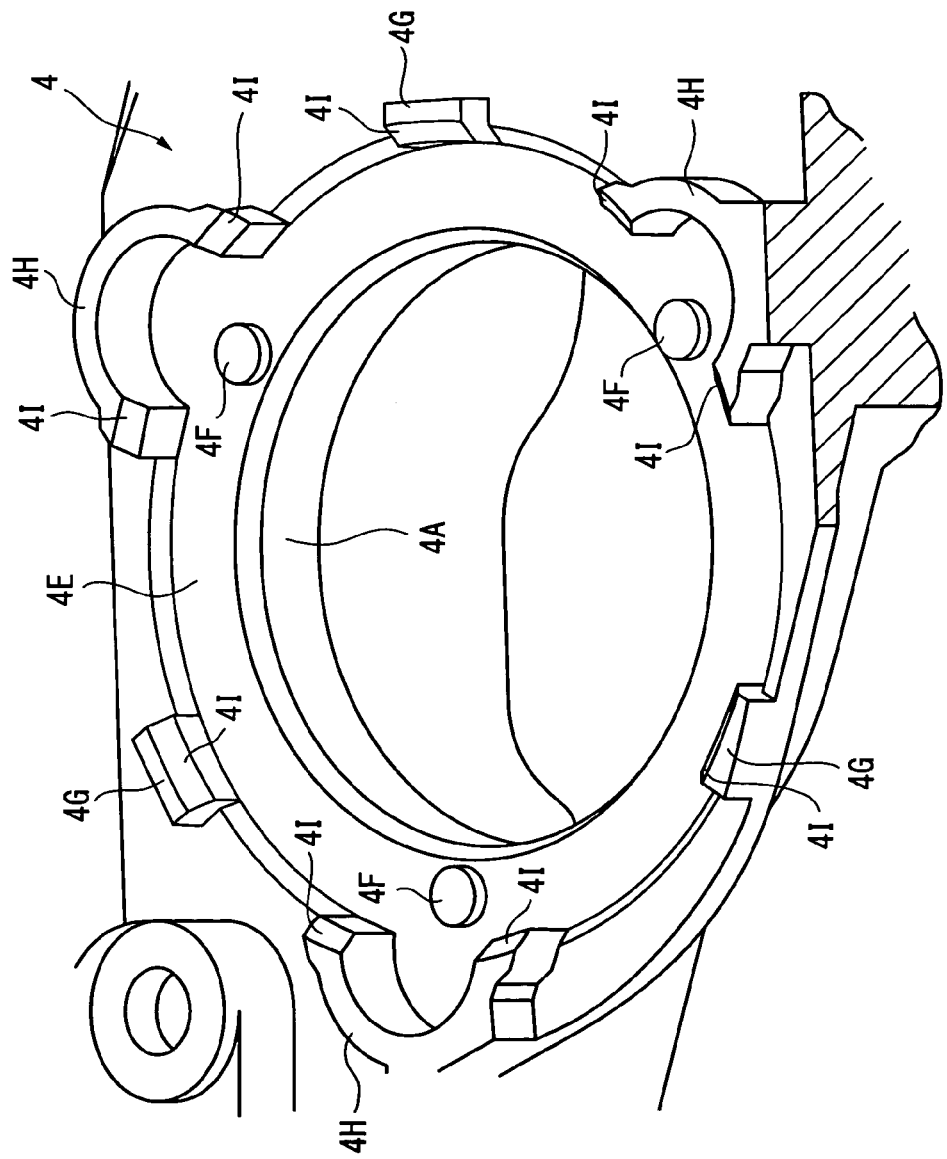
FIG. 4 is a perspective view of a main part of the lens holder, showing specifically the structure of the periphery of a mounting hole.

FIG. 4 shows details of the mounting hole 4A and the periphery thereof.

Figure 5:
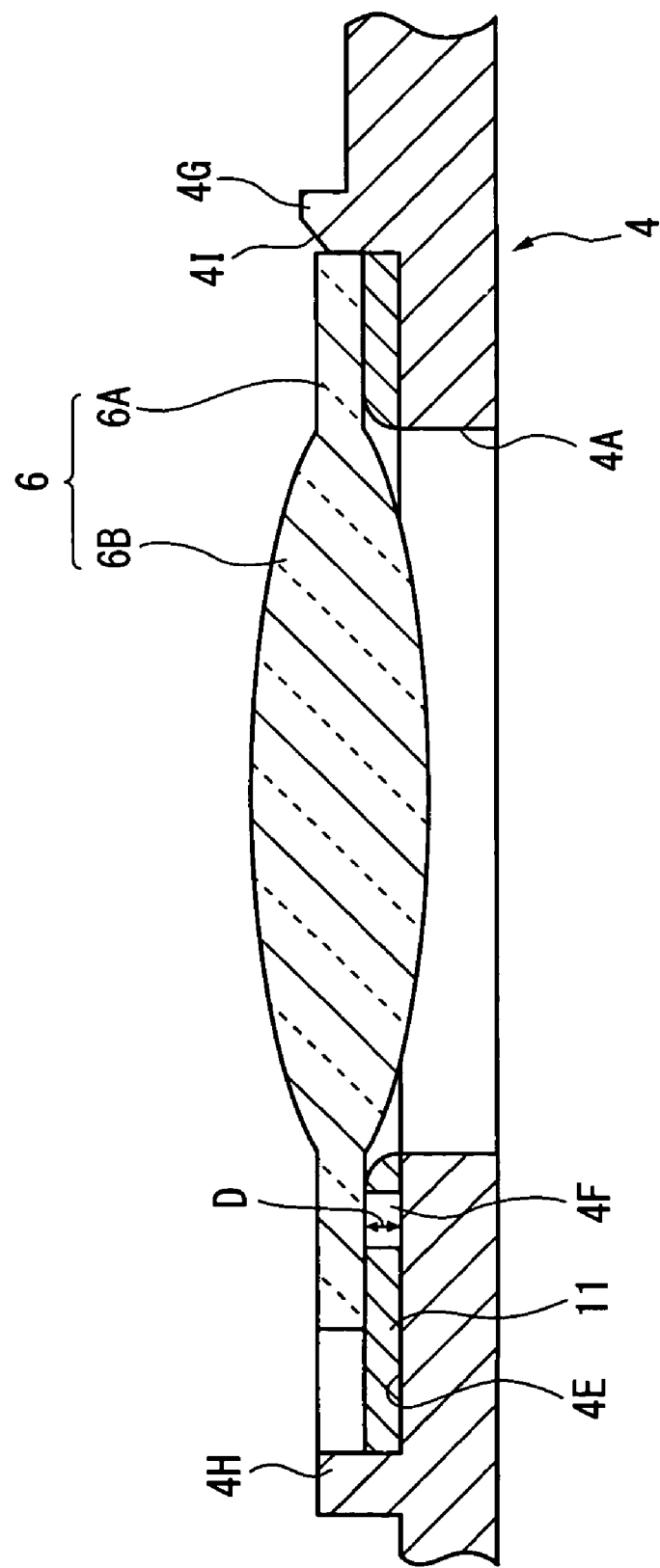
FIG. 5 is a cross-sectional view showing an objective lens mounted on the lens holder.

In FIG. 4, a lens mounting surface 4E that faces the outer peripheral portion 6A (ref. FIG. 5) of the objective lens 6 is formed substantially like a ring at the circumference of the mounting hole 4A. This lens mounting surface 4E is formed to be lower by a predetermined dimension than the flat surface of the lens holder 4.

Projections 4F as spacers are provided at three positions at equal intervals along the circumferential direction of the objective lens 6. The projections 4F are short columnar members formed integrally on the lens holder 4.

Engaging projections 4G for engaging the objective lens 6 are formed on the outer circumferential edge of the lens mounting surface 4E, at positions where the engaging projections 4G are respectively facing the projections 4F over the mounting hole 4A.

Near the projections 4F, guide portions 4H are integrally formed in the lens holder 4, to introduce an adhesive agent to the lens mounting surface 4E.

The guide portions 4H each are formed at a position that faces an adhesive injection nozzle (not shown), and each guide portion 4H has a flat semicircular uprise portion so that the adhesive agent injected from the adhesive injection nozzle might not scatter in a direction toward the outer circumference.

On each of corner portions of the engaging projections 4G and the guide portions 4H, a guide surface 4I is formed to guide the objective lens 6 to be situated above the lens mounting surface 4E.

[Mounting Structure of Objective Lens]

FIG. 5 shows the objective lens 6 mounted on the lens holder 4.

In FIG. 5, the objective lens 6 is constituted by a ring-like outer peripheral portion 6A formed at the outer circumference of the lens, and a convex lens body 6B integrally formed in the center of the outer peripheral portion 6A. The objective lens 6 is made of appropriate material such as synthetic resins, glass, or the like.

The outer peripheral portion 6A contacts the top ends of the projections 4F. An adhesive layer 11 is formed with thickness equal to the height dimension D of the projections 4F, between the lens mounting surface 4E and the part of the outer peripheral portion 6A that does not contact the projections 4F. In the present embodiment, the thickness dimension of the adhesive layer 11 (equal to the height dimension D of the projections 4F) is sufficient enough to absorb such deformation of the lens holder 4 that will be caused by resonance, e.g., 100 μm or so. Note that the thickness dimension of the adhesive layer 11 may be 100 μm or more.

This adhesive layer 11 is made of a UV adhesive agent which is cured by ultraviolet rays, and can be selected from various agents applicable to adhesion of electronic components and the like. A flexible adhesive agent is preferred in the present embodiment, among those various adhesive agents.

[Method of Mounting Objective Lens]

The objective lens 6 is set on the projections 4F of the lens holder 4 which is prepared in advance by injection molding. An adhesive agent is further applied to the guide portions 4H.

The adhesive agent then fills the clearance between the outer peripheral portion 6A and the lens mounting surface 4E. Thus, the outer peripheral portion 6A of the objective lens 6 and the lens mounting surface 4E are fixed to each other by the adhesive agent.

Unlike the manner described above, however, it is possible to adopt a method of applying an adhesive agent to the lens mounting surface 4E and then setting the objective lens 6 over the adhesive agent.

Advantages of the First Embodiment (1) According to the first embodiment, the actuator 10 moves the lens holder 4 which holds the outer peripheral portion 6A of the objective lens 6, by means of the electromagnetic drive 9. The adhesive layer 11 is formed between the lens holder 4 and the outer peripheral portion 6A of the objective lens 6. The adhesive layer 11 is arranged to have a sufficient thickness dimension enough to absorb deformation of the lens holder 4 even if the lens holder 4 causes deformation due to resonance. Therefore, even when the frequency at which the electromagnetic drive 9 operates becomes higher than the servo band, and causes resonance of the lens holder 4, the adhesive layer 11 functions as a buffer so that the deformation of the lens holder 4 is less transmitted to the objective lens 6. That is, the adhesive layer 11 has a great elastic function proportional to the thickness dimension. Even when the lens holder 4 is deformed, the deformation is absorbed by the adhesive layer 11 and is less transmitted to the objective lens 6. As a result, displacement of the objective lens 6 is reduced so aberration of the lens is reduced. The quality of the pickup device is accordingly improved.

(2) The spacers which contact the outer peripheral portion 6A of the objective lens 6 are provided between the lens holder 4 and the outer peripheral portion 6A. Therefore, the spacers allows the adhesive layer 11 to maintain easily a necessary thickness dimension. Manufacture of the actuator for use in a pickup device can hence be facilitated.

(3) The adhesive layer 11 is formed by filling an adhesive agent between the lens holder 4 and the outer peripheral portion 6A of the objective lens 6. The adhesive layer 11 can thus be easily formed throughout the entire circumference of the objective lens 6.

(4) The spacers are the projections 4F formed to be integral with the lens holder 4. Therefore, the spacers can be molded easily, and the structure of the actuator 10 can be simplified.

(5) The projections 4F are provided at three positions at substantially equal intervals along the circumferential direction of the objective lens 6. The mounted position of the objective lens 6 is therefore stable when the lens 6 is set on the projections 4F. Accordingly, the objective lens 6 is easily positioned relative to the lens holder 4. In this point of view, the quality of the pickup device is improved.

(6) Engaging projections 4G for engaging the objective lens 6 are formed on the outer circumferential edge of the lens mounting surface 4E. The objective lens 6 is therefore prevented from shifting out of the lens mounting surface 4E when the lens 6 is mounted.

(7) The guide portions 4H for introducing the adhesive agent to the lens mounting surface 4E are formed on the lens holder 4. Therefore, the adhesive agent is prevented from scattering when the adhesive agent is filled.

(8) These engaging projections 4G and guide portions 4H have corner portions at each of which a guide surface 4I is formed to guide the objective lens 6 above the lens mounting surface 4E. Therefore, the objective lens 6 can be guided smoothly to the lens mounting surface 4E when the objective lens 6 is mounted.

Second Embodiment

Next, the second embodiment of the present invention will be described with reference to FIG. 6. In the second embodiment, the structure for mounting the objective lens 6 is different from that in the first embodiment. The other structural points are the same as those of the first embodiment.

The pickup device and the actuator in the second embodiment have the same structures as those in the first embodiment as shown in FIGS. 1 and 2. The lens holder 4 is also the same as that in the first embodiment except that no projections 4F are provided.

Figure 6:
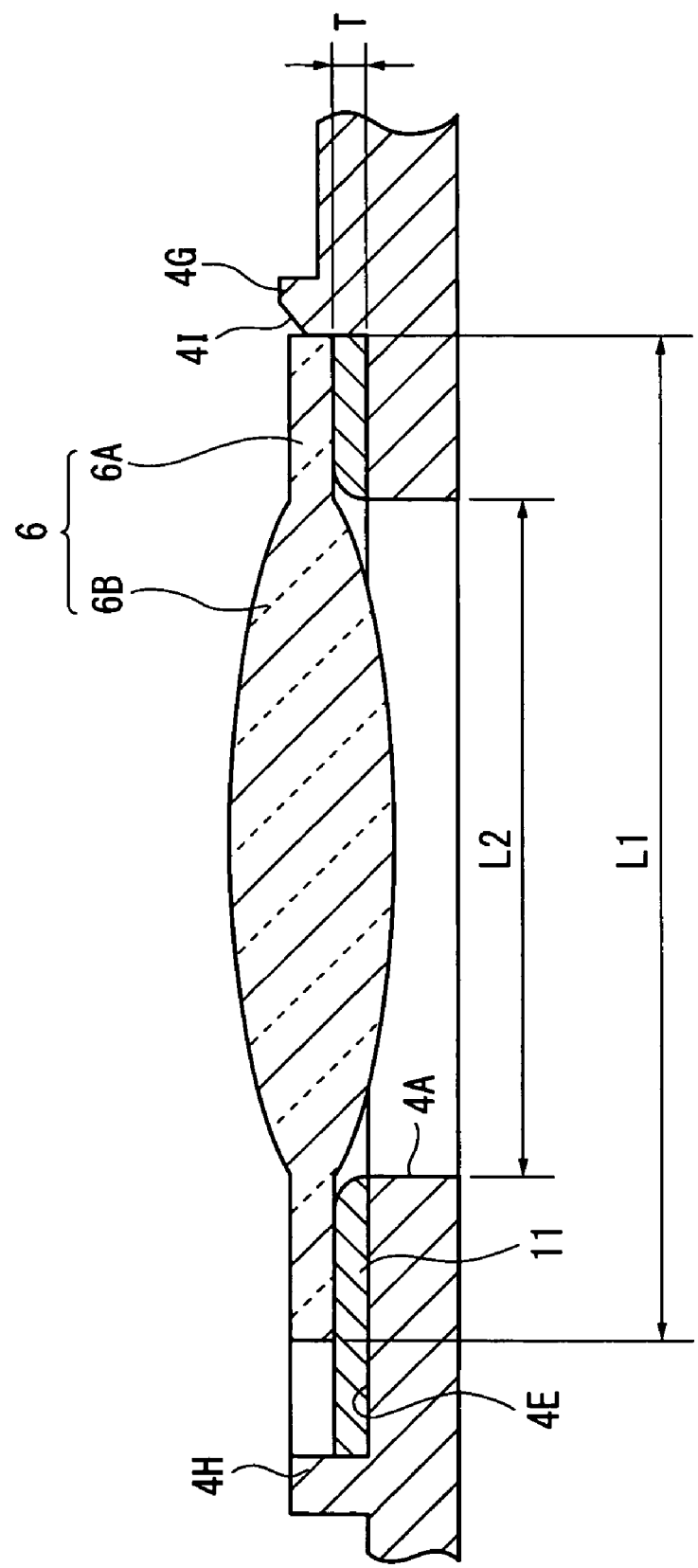
FIG. 6 is an illustration showing a second embodiment of the present invention, corresponding to FIG. 5.

FIG. 6 corresponds to FIG. 5. In FIG. 6, according to the second embodiment, the outer peripheral portion 6A of the objective lens 6 and the lens mounting surface 4E are provided with a predetermined clearance T kept between each other. The adhesive layer 11 is formed in the clearance T.

In the second embodiment, the resonance frequency f of the objective lens 6 which is obtained by the following expression (1) is set higher than the frequency (0 to 5 KHz) of a predetermined servo band applied to drive the electromagnetic drive 9 and lower than the resonance frequency (e.g., 15 KHz) of the lens holder 4. In general, the transmission constant between objects has a maximum gain at the resonance frequency of both objects. As the frequency increases beyond the resonance frequency, the gain gradually decreases. Therefore, near the resonance frequency of the lens holder 4, the resonance frequency of the objective lens 6 is exceeded, so the gain is reduced. Accordingly, the influence from the resonance of the lens holder 4 can be reduced.

The resonance frequency of the lens holder 4 mentioned herein is a resonance frequency of movable parts including not only the lens holder 4 itself but also peripheral components around the lens holder 4. Further, the resonance frequency f of the objective lens 6 is a resonance frequency relative to the lens holder 4. This resonance frequency f is therefore determined depending on the strength of the adhesive layer 11, the adhesive contacting area, and the like.

$$f = \sqrt{\frac{k}{m}} \quad (1)$$

k is the spring constant of the adhesive agent and m is the mass of the objective lens 6.

Suppose that A is a cross-sectional area of the adhesive layer 11, F is a load thereto, and x is a shrinkage amount (displacement). Since the thickness of the adhesive layer 11 is T, the Young's modulus E of the adhesive agent is obtained by the following expression (2).

$$E = \frac{\frac{F}{A}}{\frac{x}{T}} = \frac{FT}{Ax} \quad (2)$$

Further, from the Hooke's Law, the load F satisfies the relationship represented by the following expression (3) with the shrinkage amount (displacement) x and the spring constant k.

$$F = kx \quad (3)$$

From the foregoing expressions (2) and (3), the spring constant k is expanded to the next expression (4).

$$k = \frac{AE}{T} \quad (4)$$

This expression (4) is substituted into the expression (1), to obtain the following expression (5).

$$f = \sqrt{\frac{\frac{AE}{T}}{m}} \quad (5)$$

Where L1 is the dimension which is the outer diameter of the adhesive layer 11 corresponding to the outer circumference of the objective lens 6, and L2 is the dimension of the inner diameter of the adhesive layer 11, as shown in FIG. 6, the cross-sectional area A is obtained by the next expression (6).

$$A = \frac{\pi}{4} \times (L1^2 - L2^2) \quad (6)$$

In addition, the thickness dimension T of the adhesive layer 11 and the mass m of the objective lens 6 can be obtained practically, and the Young's modulus is uniquely determined by the material of the adhesive agent. Accordingly, the resonance frequency f can be obtained in the present embodiment.

For example, when WARDLOCK 8801 (commercial name) manufactured by KYORITSU CHEMICAL & CO., LTD. is used, the Young's modulus of the adhesive agent is 926000 g/cm².

Suppose that the mass m of the objective lens 6 made of synthetic resins is 0.1 g, the thickness T of the adhesive layer 11 is 0.01 cm, L1 is 0.6 cm, and L2 is 0.4 cm. The resonance frequency f is about 12 KHz.

Advantages of the Second Embodiment

The second embodiment provides the following functions and advantages, in addition to the same functions and advantages of the articles (6) to (8) in the first embodiment.

(9) The actuator 10 moves the lens holder 4 which holds the outer peripheral portion 6A of the objective lens 6, by means of the electromagnetic drive 9. The outer peripheral portion 6A of the objective lens 6 and the lens holder 4 are arranged so as to maintain a predetermined clearance therebetween. The adhesive layer 11 is formed by providing an adhesive agent in the clearance. The resonance frequency f of the objective lens 6 which is obtained by the expression (1) described above is set to 12 KHz, i.e., higher than the frequency of 0 to 5 KHz of a predetermined servo band applied to drive the electromagnetic drive 9 for focusing control and lower than the resonance frequency 15 KHz of the lens holder 4. Therefore, even when the frequency of the electromagnetic drive 9 rises beyond the servo band and reaches the resonance frequency of 15 KHz of the lens holder 4, this resonance frequency of the electromagnetic drive is still higher than the resonance frequency of 12 KHz of the objective lens 6. Accordingly, at this time, the gain is so low that the influence from resonance is small. As a result, the lens distortion is reduced, leading to improvements in quality of the pickup device.

Modifications of Embodiments

The present invention is not limited to the embodiments described above but may include the following modifications within the scope in which the objects of the present invention can be achieved.

For example, in the foregoing embodiments, the engaging projections 4G for engaging the objective lens 6 are formed on the outer circumferential edge of the lens mounting surface 4E, and the guide portions 4H are further formed on the lens holder 4. In the present invention, however, the engaging projections 4G and the guide portions 4H may be omitted, and the top surface of the lens holder 4 may be formed into a flat surface.

In addition, the structure of the electromagnetic drive 9 is not limited to the embodiments described above. For example, the coil boards 5A and 5B need not be formed of printed boards but may be formed from spiral coils.

In the embodiments described above, the adhesive agent is filled between the outer peripheral portion 6A of the objective lens 6 and the lens holder 4, to form the adhesive layer 11 throughout the entire circumference of the objective lens 6. In the present invention, however, the adhesive layer 11 may be formed partially. For example, the adhesive layer 11 may be formed only near the projections 4F.

In the first embodiment, the spacers which contact the outer peripheral portion 6A of the objective lens 6 are provided between the outer peripheral portion 6A of the objective lens 6 and the lens holder 4. In the present invention, however, those spacers may be omitted. That is, in the first embodiment, the projections 6F as the spacers may be eliminated, and the objective lens 6 may have no contact at all with the lens holder 4. In this case, the objective lens 6 may be fixed by an adhesive agent while the objective lens 6 is kept floating from the lens holder 4 by any tool or the like in the manufacturing process.

Also in the first embodiment, the spacers are the projections 4F formed to be integral with the lens holder 4. In the present invention, however, the spacers may be components separated from the lens holder 4 or projections formed integrally on the outer peripheral portion 6A of the objective lens 6.

If the spacers are the projections 4F formed integrally on the lens holder 4, the number of spacers is not limited to three but may be one, two, four, or more. If plural projections 4F are used, the projections 4F need not limitedly provided at substantially equal intervals but may be concentrated on a predetermined position.

Also in the first embodiment, the projections 4F are each formed in a columnar shape having a short height dimension. However, the projections 4F may be formed in a polyangular columnar shape such as a quadric or triangular prism or the like, or in a conical or pyramidal shape.

Also in the first embodiment, the outer peripheral portion 6A and the lens holder 4 are fixed to each other by the adhesive layer 11. However, the present invention does not strictly require the relationship of fixture between the outer peripheral portion 6A of the objective lens 6 and the lens holder 4. The outer peripheral portion 6A and the objective lens 6 need only to adhere to each other.

Further, the first and second embodiments may be combined with each other. Specifically, projections as spacers may be provided in the second embodiment.

What is claimed is:

1. An actuator for use in a pickup device, which moves a lens holder holding an outer peripheral portion of an objective lens and defining a lens attachment surface thereon, wherein an adhesive layer is formed between the outer peripheral portion of the objective lens and the lens attachment surface, the adhesive layer having a thickness dimension which is sufficient enough to absorb deformation of the lens holder when the lens holder is deformed due to resonance, the outer peripheral portion of the objective lens and the lens holder being spaced apart by the adhesive layer on the entirety of the outer peripheral nortion of the objective lens.

2. The actuator for use in a pickup device, according to claim 1, wherein the adhesive layer is formed by filling an adhesive agent between the outer peripheral portion of the objective lens and the lens holder.

3. The actuator according to claim 1, wherein the adhesive layer is flexible.

4. An actuator for use in a pickup device, which moves a lens holder holding an outer peripheral portion of an objective lens by means of an electromagnetic drive, wherein the outer peripheral portion of the objective lens and the lens holder are provided, maintaining a predetermined clearance between each other, an adhesive agent is provided in the clearance, and a resonance frequency f of the objective lens is set higher than a predetermined servo band to be applied to drive the electromagnetic drive, and lower than a resonance frequency of the lens holder, the resonance frequency f of the objective lens being obtained by an expression:

$$f = \sqrt{\frac{k}{m}}$$

where k is a spring constant of the adhesive agent and m is mass of the objective lens, wherein the entire circumference of the outer peripheral portion of the objective lens is provided with a clearance.

5. An actuator for a pickup device, comprising:

a lens holder having a mounting hole for holding an objective lens;

an electromagnetic drive for moving the lens holder;

a ring-shaped recess provided on an outer periphery of the mounting hole, the recess defining a lens attachment surface thereon;

a plurality of projections provided on the recess and spaced apart from each other along the circumferential direction of the objective lens to be in contact with an outer periphery of the objective lens; and an adhesive layer formed between the outer peripheral portion of the objective lens and the lens attachment surface, the outer peripheral portion of the objective lens being supported by the projections.

6. The actuator according to claim 5, wherein the thickness of the adhesive layer is 100 µm or more.

7. The actuator according to claim 5, wherein the adhesive layer is flexible.

8. The actuator for use in a pickup device according to claim 7, wherein the projection is formed integrally on the lens holder.

9. The actuator for use in a pickup device according to claim 8, wherein the projection is provided at each of three positions maintaining a substantially equal interval between each other.

* * * * *